C. GREEN, Jr.
FASTENER.
APPLICATION FILED SEPT. 25, 1916.
1,237,201.
Patented Aug. 14, 1917.
—Fig.1.—
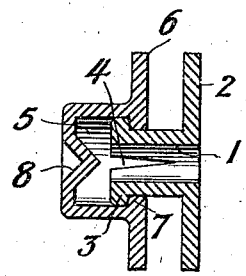
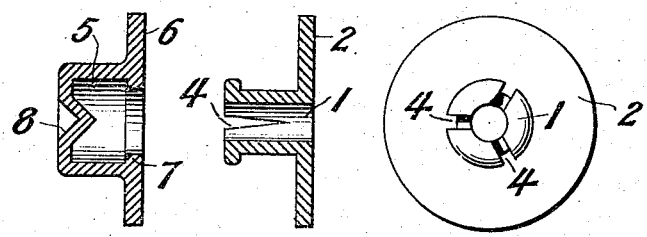
—Fig.2.— —Fig.3.— —Fig.4.— ively sprung into a socket on the other part. In such
UNITED STATES PATENT OFFICE.

CHARLES GREEN, JR., OF KINGS CROSS, LONDON, ENGLAND.

FASTENER.

1,237,201. Specification of Letters Patent. Patented Aug. 14, 1917.

Application filed September 25, 1916. Serial No. 122,123.

*To all whom it may concern:*

Be it known that I, CHARLES GREEN, Junior, engineer, a subject of the King of Great Britain, residing at 21 Northdown street, Kings Cross, in the county of London, England, have invented certain new and useful Improvements in Fasteners, of which the following is a specification.

This invention refers to improvements in fastenings of a known type employed for detachably connecting together two parts of material; such known fastenings comprise a stud part to be fixed to one part of the material to be connected, this stud part comprising a split tube having a flanged or enlarged end which is adapted to be sprung into the mouth of a cup part fixed on the other part of the material to be connected, or having a rounded or balled head on one part, capable of being resiliently sprung into a socket on the other part. In such fastenings the one part can be detached from the other part by pulling the two parts apart with more or less force, but when such a fastener has been fastened and unfastened a sufficient number of times the force required to detach the two parts becomes very small and the parts of the garment or other material are liable to become detached the one from the other at an undesirable time. The object of the present invention is to obviate this inconvenience.

The invention will be described with reference to the accompanying drawings, whereon Figure 1 is a vertical section showing the two members in engagement, Fig. 2 showing the socket member in section, Fig. 3 the stud member in section, and Fig. 4 being a left-hand end view of Fig. 3.

Referring to the drawings, the stud member is made tubular, that is to say it may consist of a plate 2 by which it is secured to one part of the material to be connected, and extending from the plate 2 is an open-ended tube 1 having at its open end an external flange or bead 3, and the tube 1 is further divided for a short distance at its flanged end at 4 in the direction of the axis, and such divisions may be V-shaped, thereby enabling the flanged end 3 of the tube 1 to be capable of slight expansion or contraction in the direction of the diameter.

The socket member consists of a cup-shaped part 5 having a flange or plate 6 by which it is secured to the material to be connected, the diameter of the interior of the cup 5 being slightly greater than the entrance aperture through which the tubular flanged end 3 of the stud passes. The said flanged end of the stud is normally of slightly greater diameter than the entrance aperture of the cup, so that upon pressure being applied to the stud it will spring through the aperture of the socket and be retained therein by the internal flange 7 existing at the mouth of the socket. In the interior of the cup-like socket 5 and at the base I form a projection 8 located centrally, which projection may be, and preferably is, conical so that if the stud is pressed into the cup-like socket 5 and against the base thereof, the conical projection 8 will enter the tubular stud and expand the same (forming an expansion device), whereby the stud will offer greater resistance to extraction.

The diameter of the interior of the cup-shaped socket 5 is such that the extent of expansion of the stud by the conical projection 8 is limited by the diameter of the socket.

By this means the stud can be snapped into the socket 5 as is common with this type of fastener, while if it is desired that greater resistance than usual shall be offered to disengagement, the stud can be pressed with greater force than usual into the socket 5 and slight expansion of the tubular end of the stud will take place, thereby rendering the fastener more secure.

It will be obvious that the depth of the socket 5 may be such, as indicated at Fig. 1, that the stud member 1 can be snapped into the socket member as is common in this class of fastenings, and this without the expansion cone 8 being brought into operation, whereas by then pressing the stud member further into the socket member, the cone expands the stud member as has been described.

Fastenings according to this invention are applicable to articles of wearing apparel, to hoods or covers for vehicles, and can be employed for any other purposes where it is required that two parts shall be quickly and detachably secured together.

What I claim as my invention and desire to secure by Letters Patent is:—

1. In fastenings for detachably connecting together two parts of material; the combination with a stud member comprising an open-ended tube, means for securing one end of said tube to one part of said material, said tube having divisions extending for a distance from its open end, and an external enlargement on said open end of said tube; of a socket member comprising a cup-shaped part, means for securing the latter to the other part of said material, said cup-shaped part having its entrance mouth of lesser diameter than the interior of the cup or the normal diameter of said open-ended divided tube which is adapted to be sprung past said mouth and into said cup, and a fixed projection in the interior and at the base of said cup to expand said open end of said tube when the latter is pressed thereon to cause said tube to offer greater resistance to extraction from said cup.

2. In fastenings for detachably connecting together two parts of material; the combination with a stud member comprising a plate to be secured to one part of said material, an open-ended tube projecting therefrom and having divisions extending for a distance from its open end, and an external enlargement at said open end of said tube; of a socket member comprising a cup-shaped part, an external flange on same to be secured to the second part of the material to be connected, an inwardly extending flange at the mouth of said cup-shaped part past which flange said external flanged end of said open-ended divided tube can be sprung and by which flanges of said tube and said cup-shaped part said stud member is retained, and a fixed conical projection in the interior of said cup-shaped part and at the base thereof over which said open end of said divided tube can be pressed to expand the flanged end of said tube to cause same to offer greater resistance to extraction from said cup-shaped part.

3. In fastenings for detachably connecting together two parts of material; the combination with a stud member comprising an open-ended tube, means for securing one end of said tube to one part of said material, said tube having divisions extending for a distance from its open end, and an external enlargement on said open end of said tube; of a socket member comprising a cup-shaped part, means for securing the latter to the other part of said material, an inwardly extending flange at the mouth of said cup-shaped part past which flange said external enlargement of said open-ended divided tube can be sprung, a fixed conical projection in the interior of said cup-shaped part and at the base thereof over which said open end of said divided tube can be pressed to expand the end of said tube, and the interior of said cup-shaped part having a diameter greater than its entrance aperture and such as to limit the extent of expansion of the end of said tube having said external enlargement, substantially as set forth.

In witness whereof I have hereunto set my hand in the presence of two witnesses.

CHARLES GREEN, Junr.

Witnesses:
   Thomas William Rogers,
   William A. Marshall.